(12) United States Patent
Jones et al.

(10) Patent No.: US 6,458,727 B1
(45) Date of Patent: Oct. 1, 2002

(54) OLEFIN POLYMERS

(75) Inventors: Richard Albert Jones; Ian MacMillan Ward; Peter John Hine; Mark James Bonner, all of Leeds (GB)

(73) Assignee: University of Leeds Innovative Limited, Leeds ( * ) Notice: Subject to any disclaimer, the term of this patent is extended or adjusted under 35 U.S.C. 154(b) by 207 days.

(21) Appl. No.: 09/629,182

(22) Filed: Jul. 31, 2000

Related U.S. Application Data

(62) Division of application No. 09/285,256, filed on Apr. 2, 1999, now Pat. No. 6,328,923.

(30) Foreign Application Priority Data

Oct. 4, 1996 (GB) ............................................. 9620692
Oct. 6, 1997 (WO) .............................. PCT/GB97/02675

(51) Int. Cl.⁷ ............................ D04H 3/14; B29C 35/08
(52) U.S. Cl. .................... 442/409; 428/198; 428/297.4; 428/298.1; 428/299.7; 264/322; 264/494
(58) Field of Search .................................. 264/322, 494, 264/495; 428/198, 297.4, 298.1, 299.7; 442/409

(56) References Cited

U.S. PATENT DOCUMENTS

| | | |
|---|---|---|
| 3,997,386 A | 12/1976 | Oshida et al. |
| 4,048,364 A | 9/1977 | Harding et al. |
| 4,082,731 A | 4/1978 | Knopka |
| 4,110,391 A | 8/1978 | Berzen et al. |
| 4,228,118 A | 10/1980 | Wu et al. |
| 4,285,748 A | 8/1981 | Booker et al. |
| 4,332,767 A * | 6/1982 | Kitanaka et al. ............ 264/322 |
| 4,403,012 A | 9/1983 | Harpell |
| 4,413,110 A | 11/1983 | Kavesh et al. |
| 4,455,527 A | 6/1984 | Harpell et al. |
| 4,483,727 A | 11/1984 | Eickman et al. |
| 4,551,296 A | 11/1985 | Kavesh et al. |
| 4,568,581 A | 2/1986 | Peoples, Jr. |
| 4,786,348 A | 11/1988 | Luise |
| 4,923,660 A * | 5/1990 | Willenberg et al. ......... 264/103 |
| 4,948,661 A | 8/1990 | Smith et al. |
| 4,990,204 A | 2/1991 | Krupp et al. |
| 5,006,390 A | 4/1991 | Kavesh et al. |
| 5,135,604 A | 8/1992 | Harpell et al. |
| 5,244,482 A | 9/1993 | Hassenboehler, Jr. et al. |
| 6,017,834 A * | 1/2000 | Ward et al. ................. 442/409 |

FOREIGN PATENT DOCUMENTS

| | | |
|---|---|---|
| EP | 0 116 845 | 1/1984 |
| EP | 0 201 029 | 4/1986 |
| GB | 2253420 B | 9/1992 |
| JP | 1-48743 | 9/1990 |

* cited by examiner

*Primary Examiner*—Terrel Morris
*Assistant Examiner*—Ula C. Ruddock
(74) *Attorney, Agent, or Firm*—Nixon & Vanderhye

(57) ABSTRACT

A polyolefin plaque is made by hot compaction of an assembly of fibers of the oriented polymer. It has been found to be beneficial to subject the fibers to a prior crosslinking process. Hot compaction is then less temperature-sensitive and produces plaques with excellent hot strength properties. Preferably the fibers have been subjected to prior stages of irradiation and annealing, both in a non-oxidising environment, for example acetylene.

2 Claims, 7 Drawing Sheets

OLEFIN POLYMERS

This is a divisional of application Ser. No. 09/285,256, filed Apr. 2, 1999, now U.S. Pat. No. 6,328,923, the entire content of which is hereby incorporated by reference in this application.

This invention relates to processes for the production of polymer sheet materials from oriented olefin polymer fibers and to the products of such processes.

GB 2253420B describes a process whereby an assembly of fibers of an oriented polymer may be hot compacted to form a sheet having good mechanical properties. The process involves an initial processing step in which the fibers are brought to and held at the compaction temperature whilst subject to a pressure sufficient to maintain the fibers in contact, the contact pressure, and thereafter compacted at a higher pressure for a few seconds, the compaction pressure. In the process a proportion of the fibre surfaces—most preferably from 5 to 10% by weight—melts and subsequently recrystallises on cooling. This recrystallised phase binds the fibers together. Preferred materials for use in this process are homo- and co-polymers of polyethylene.

The process of GB 2253420B can be used to produce complicated and precisely shaped monolithic articles having high stiffness and strength, and good energy-absorbing properties. However, a drawback of this process is the criticality of the compaction temperature, especially for polyethylene. This is shown by Comparative Example A in GB 2253420B.

In accordance with the present invention there is provided a process for the production of a monolithic article in which process an assembly of fibers of an oriented polyolefin polymer is subjected to a compaction process wherein the assembly of fibers is maintained in intimate contact at an elevated temperature sufficient to melt a proportion of the polymer, and is compressed, characterised in that prior to the compaction process the fibers have been subjected to a crosslinking process.

In some embodiments (referred to herein as "2-step compactions") the compaction process may comprise two distinct steps, namely a step of maintaining the assembly of fibers in intimate contact at an elevated temperature sufficient to melt a proportion of the fibre at a first, contact, pressure, and a subsequent compression step wherein the assembly is subjected to a second, compaction, pressure, higher than the contact pressure—as in GB 2253420B.

In some embodiments (referred to herein as "1-step compactions") the compaction process may comprise a single step of maintaining the assembly of fibers in intimate contact at an elevated temperature sufficient to melt a proportion of the fibre, and at a given pressure. In such embodiments there is no subsequent step of applying a higher pressure.

Preferably the monolithic article is an article which is shape stable under its own weight, such as a plaque.

The crosslinking process may be a chemical crosslinking process, involving the use of a chemical reagent which forms reactive radicals under predetermined initiation conditions. Suitably the reagent may be a cumene compound, or a peroxide, for example DMTBH or DCP, or a silane, for example a vinyl silane, preferably vinylmethoxy silane.

The crosslinking process may be an irradiation crosslinking process involving an ionising step comprising irradiating the fibers with an ionising radiation, and then an annealing step comprising annealing the irradiated polymer at an elevated temperature.

For general information on known crosslinking processes, reference may be made to Sultan & Palmlöf, "Advances in Crosslinking Technology", Plast. Rubb. and Comp. Process and Appl., 21, 2, pp. 65–73 (1994), and to the references therein.

Irradiation crosslinking is believed to be particularly suitable, for the process of the present application.

The pre-compaction process of crosslinking has been found to increase the "temperature window" available for the subsequent compaction stage, and thus to make the compaction stage much easier to control. Further, compacted products produced by the process of the present invention have exhibited superior hot strength properties, compared with compacted products made from fibers which have not been subject to prior crosslinking.

The term "fibers" is used herein in a broad sense to denote strands of polyolefin polymer, however formed. The fibers subjected to prior crosslinking may be non-woven fibers laid in a web, or may be comprised within yarns, or constituted by bands or fibrillated tapes, for example formed by slitting films. If comprised within yarns or constituted by bands or fibrillated tapes, those yarns, bands or fibrillated tapes may be laid together or they may be formed into a fabric, for example by weaving or knitting.

Suitably the fibers used in the process of the invention are formed from molten polymer, for example as melt spun filaments.

Preferably the fibers used in the present invention have a weight average molecular weight in the range 10,000 to 400,000, preferably 50,000 to 200,000.

The polyolefin polymer can be selected from polyethylene, polypropylene or polybutylene, or copolymers comprising at least one of those olefin polymers. The polyolefin polymer used in the process of the present invention may suitably be a polypropylene homopolymer or a copolymer containing a major proportion of polypropylene. Advantageously it may be a polyethylene homopolymer or a copolymer containing a major proportion of polyethylene.

A polyethylene copolymer comprising a major proportion of polyethylene as defined herein is one comprising more than 50% by weight of polyethylene. Preferably, it comprises more than 70% by weight of polyethylene, most preferably, more than 85% by weight of polyethylene.

A polyethylene polymer as defined herein may be unsubstituted, or substituted, for example by halogen atoms, preferably fluorine or chlorine atoms. Unsubstituted polyethylene polymers are however preferred.

A polyethylene copolymer comprising a major proportion of polyethylene may have one or more different copolymers, following copolymerisation of ethylene with, for example, one or more of propylene, butylene, butadiene, vinyl chloride, styrene or tetrafluoroethylene. Such a polyethylene copolymer may be a random copolymer, or a block or graft copolymer. A preferred polyethylene copolymer is a ethylene-propylene copolymer, having a major proportion of polyethylene and a minor proportion of polypropylene.

A polypropylene copolymer comprising a major proportion of polypropylene as defined herein is one comprising more than 50% by weight of polypropylene. Preferably, it comprises more than 70% by weight of polypropylene, most preferably, more than 85% by weight of polypropylene.

A polypropylene polymer as defined herein may be unsubstituted, or substituted, for example by halogen atoms, preferably fluorine or chlorine atoms. Unsubstituted polypropylene polymers are however preferred.

A polypropylene copolymer comprising a major proportion of polypropylene may have one or more different copolymers, following copolymerisation of propylene with, for example, one or more of ethylene, butylene, butadiene, vinyl chloride, styrene or tetrafluoroethylene. Such a polypropylene copolymer may be a random copolymer, or a block or graft copolymer. A preferred polypropylene copolymer is a propylene-ethylene copolymer, having a major proportion of polypropylene and a minor proportion of polyethylene.

It is essential in the practice of the present invention that the process employs fibers which have been subjected to a crosslinking process. However, the co-use of a polymer component (not necessarily a polyolefin) which has not been subjected to a crosslinking process, and/or of an inorganic filler material, is not excluded.

A polymer which has not been subjected to a crosslinking process may, when present, be present in an amount up to 50 vol % of the total polymer content of the article. Preferably, however, substantially the entire polymer content of the article derives from polyolefin polymer which has been subject to a crosslinking process.

An inorganic filler material may be present. An inorganic filler, when present, may be present in an amount up to 60 vol % of the article, preferably 20 to 50 vol %. An inorganic filler material may, for example, be selected from silica, talc, mica, graphite, metal oxides, carbonates and hydroxides and apatite, for example hydroxyapatite, a biocompatible calcium phosphate ceramic.

The preferred crosslinking process, involving irradiation crosslinking, will now be further defined.

Preferably, the environment for the annealing step which follows irradiation is a gaseous environment.

Preferably the irradiation step is effected in an environment which is substantially free of oxygen gas. For example it could be performed in vacuo or in the presence of an inert liquid or gas. Preferably however the environment for the irradiation step comprises a monomeric compound selected from alkynes, and from alkenes having at least two double bonds.

Preferably, the annealing step which follows irradiation is carried out in an environment which is substantially free of oxygen gas but which comprises a monomeric compound selected from alkynes, and from alkenes having at least two double bonds.

There is no necessity for the environments to be the same, in the irradiation and annealing steps. Indeed there is no necessity for said monomeric compound used during the irradiation step to be the same as said monomeric compound used in the annealing step; the monomeric compound used in the irradiation step could be replaced in whole or in part by a different monomeric compound for the annealing step. However it is believed that the properties desired of said monomeric compound in the irradiation step will generally be the same as those required in the annealing step, so there will generally be no necessity to effect a whole or partial replacement. Most conveniently, therefore, the monomeric compound is the same throughout. In some cases however it may be advantageous to supply a further charge of said monomeric compound, as the process proceeds.

For either or both steps, a mixture of monomeric compounds could be employed.

The environment employed for the irradiation and/or the annealing steps is preferably constituted entirely by said monomeric compound, but may also comprise a mixture being said monomeric compound together with one or more other components, for example an inert gas or liquid. Suitably the said monomeric compound is gaseous at least under the treatment conditions employed and is employed in the irradiation and/or annealing steps at a pressure, or partial pressure in the case of a mixture, in the range of 0.2–4 atmospheres ($2\times10^4$Pa–$4\times10^5$Pa), preferably 0.5–2 atmospheres ($5\times10^4$Pa–$2\times10^5$Pa), most preferably 0.3–1 atmospheres ($3\times10^4$Pa–$1\times10^5$Pa).

Preferred monomeric compounds for use in the present invention, in either or both of the irradiation and annealing steps, are alkynes, and alkenes having at least two double bonds, which alkenes are not substituted by halogen atoms. They are desirably gaseous under the treatment conditions employed and should be able to diffuse into the polyolefin polymer under the treatment conditions employed. Preferred are unsubstituted alkynes or alkenes i.e. alkynes or alkenes made up substantially entirely by hydrogen and carbon atoms. Examples are unsubstituted $C_{2-6}$ alkynes, preferably having only one triple bond, for example acetylene, methyl acetylene, dimethyl acetylene and ethyl acetylene (of which species acetylene is preferred) and unsubstituted $C_{4-8}$ alkenes having at least two double bonds, preferably only two double bonds, for example 1,3-butadiene, 1,3-pentadiene, 1,3-hexadiene, 1,4-hexadiene and 1,3,5-hexatriene (of which species 1,3-butadiene is preferred).

One preferred class of alkenes for use in the present invention has at least two conjugated double bonds, thus including 1,3-butadiene, 1,3-pentadiene, 1,3-hexadiene and 1,3,5-hexatriene. Preferably the conjugation extends throughout the length of the compound, as is the case with 1,3-butadiene and 1,3,5-hexatriene.

Another preferred class of alkenes for use with the present invention has double bonds at least as the terminal bonds in the compounds, thus including 1,3-butadiene and 1,3,5-hexatriene.

A particularly preferred class of alkenes has at least two conjugated double bonds, preferably with the conjugation extending throughout the length of the compounds, and double bonds at least as the terminal bonds of the compounds. Compounds of this type thus include 1,3-butadiene and 1,3,5-hexatriene.

Preferably said alkyne or alkene having at least two double bonds is the sole crosslinking agent employed in the irradiation step and/or the annealing step.

Acetylene is an especially preferred monomeric compound for use in the present invention. Preferably acetylene is used as substantially the sole said monomeric compound both in the irradiation step and in the annealing step.

Suitably the irradiation step is effected at a temperature not exceeding 100° C., preferably not exceeding 80° C. A preferred range is 0–50° C., most preferably 15–30° C. Conveniently the step is effected at ambient temperature.

In carrying out the process of this invention, any ionizing radiation can be employed. In practice, however, the types of ionizing radiation which can be used with greatest practicality are electron beams, ultra-violet radiation and, especially, γ-rays.

The radiation dose is suitably in the range 0.5 to 100 MRads inclusive, preferably 1 to 50 MRads inclusive, most preferably 2 to 20 MRads inclusive. For many applications a radiation dose of 3 to 10 MRads inclusive appears very favourable.

Preferably the polyolefin polymer is annealed at a temperature of at least 60° C., preferably at a temperature in the range 80 to 120° C. inclusive.

Preferably the polyolefin polymer is annealed at an annealing temperature at least 20° C. below its melting point, most preferably at an annealing temperature which is below its melting point by a temperature differential in the range 20 to 50° C., inclusive, most preferably, 30 to 40° C., inclusive.

The period for which annealing is carried out is not thought to be critical, provided that the time is sufficient for substantially all of the polymer which has been irradiated to reach the said annealing temperature and for substantially all of the radicals formed to have reacted. This can be assessed by trial and error following ESR or mechanical testing of irradiated and annealed samples; the presence of unreacted radicals is believed to lead to chain scission and diminution in mechanical properties.

Suitably the polyolefin polymer after the irradiation and annealing steps has a gel fraction at least 0.4, preferably at least 0.5. Preferably the polyolefin polymer after the irradiation and annealing steps has a gel fraction no greater than 0.85, preferably no greater than 0.75. A particularly preferred gel fraction is in the range 0.55 to 0.7, most preferably 0.6 to 0.65.

In accordance with the present invention there is provided a polyolefin polymer monolith prepared in accordance with the process of the invention, as defined above.

In relation to the compaction stage which follows the steps of irradiation and annealing, the description in GB 2253420B is in general applicable to the modified process of the present invention, for example in relation to treatment times, temperature, proportion of material which is to melt, the assembly of the fibers and molecular weights, and the description of GB 2253420B may be regarded as incorporated into the present specification by reference, insofar as it applies to the production of polyolefin articles. However, the preferred pressure conditions are different, and are set out below.

In 2-step compactions in accordance with the present invention the contact pressure is suitably in the range 0.01 to 2 MPa, preferably 0.1 to 1 MPa, most preferably 0.3 to 0.7 MPa; and the compaction pressure is suitably in the range 0.1 to 50 MPa, preferably 0.2 to 10 MPa, most preferably 0.3 to 7 MPa. In such 2-stage processes the compaction pressure should be higher than the contact pressure, suitably by a factor of at least 2, and preferably by a factor of at least 4.

In 1-step compactions in accordance with the present invention the (single) pressure applied is suitably in the range 0.1 to 10 MPa, preferably 0.2 to 5 MPa, most preferably 0.3 to 4 MPa.

It is especially preferred that the pressure, or maximum pressure, is such that the process may be carried out in an autoclave, or in a belt press or other apparatus in which the assembly is fed through a compaction zone in which it is subjected to said elevated temperature and said pressure.

A further difference between the present invention and that of GB 2253420B is that in the process of the invention the proportion of the polymer which melts is suitably at least 10% by weight, preferably 10 to 50% by weight.

BRIEF DESCRIPTION OF THE DRAWINGS

The invention will now be described in more detail with reference to the accompanying drawings, in which:

FIG. 10 shows a further plot of strength versus compaction temperature for TEN FOR;

The invention will now be further described, by way of example, with reference to the examples which follow.

Samples

In the first examples, the materials used were commercially available oriented melt spun homopolymeric polyethylene, sold as a 1800 denier multifilament yarn under the Trade Mark TENFOR, and as a 250 denier multifilament yarn, under the Trade Mark CERTRAN. The polyethylene of TENFOR and CERTRAN is of the same grade, and is characterised as follows:

| Molecular Weight | | | Breaking Strength | Tensile Modulus | |
|---|---|---|---|---|---|
| | | | | Initial Secant | 2% |
| Mw | Mn | Process | GPa | GPa | GPa |
| 130,000 | 12,000 | melt spun | 1.3 | 58 | 43 |

Pre-treatment and Annealing

A bobbin of the TENFOR polyethylene was subjected to γ-radiation at a low dose rate (less than 0.1 MRad/hour) at ambient temperature under an atmosphere of acetylene at a pressure of about $5 \times 10^4$ Pa above atmospheric. The total dose was 7.39 MRad. After irradiation the sample was annealed for 2 hours at 110° C. under an atmosphere of acetylene at a pressure of $5 \times 10^4$ Pa above atmospheric. The resultant gel content was 80.9%. Physical properties of the resultant irradiated and annealed fibre were as follows:

Density: $979.3 \pm 0.1$ kg/m$^3$

Tensile modulus: $30 \pm 1$ GPa (fibre straight off the bobbin; 1%/min)

Tensile strength: $0.82$ GPa$\pm 0.01$ GPa (fibre straight off the bobbin; 1%/min)

The CERTRAN polyethylene yarns, ten 3 g hanks, were wound onto glass tubes and were subjected to electron beam irradiation at a fast dose rate (0.655 MRad/min) for 7 minutes at ambient temperature under an atmosphere of acetylene at $3 \times 10^4$ Pa above atmospheric pressure. Because of the high dose rate the temperature of the sample increased during irradiation. No external temperature control was used. The total dose was about 4.6 MRad. After irradiation the sample was annealed for 2 hours at 90° C. under an atmosphere of acetylene at $3 \times 10^4$ Pa above atmospheric pressure. Consequently eight samples with gel contents between 69.4% and 71.8% were produced with the remaining two samples having gel contents of 77% and 84%.

Figure 1:
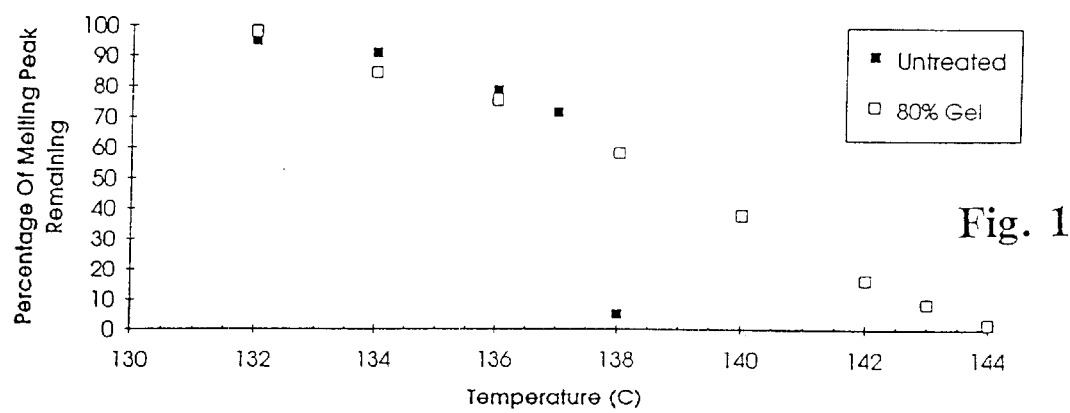
FIG. 1 is a plot of percentage of melting peak remaining against temperature of TENFOR.
Figure 2:
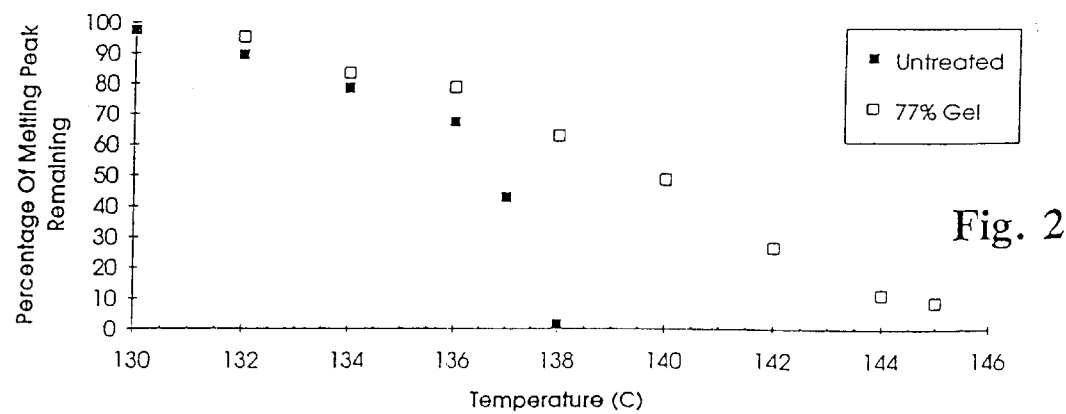
FIG. 2 is a graph of percentage of melting peak remaining against temperature for CERTRAN.

Preliminary DSC experiments were performed on the irradiated and annealed TENFOR and CERTRAN yarns, in comparison to untreated fibers, to assess melting thereof. Partial melting experiments were carried out, in which the yarns were held for ten minutes at a given SOAK temperature before being cooled and scanned. This allowed a comparison of the normalised area of the DSC melting peak for different amounts of partial melting, and hence gave an indication of the amount of fibre which was destroyed by melting, at that temperature. FIG. 1 is a graph in which the results for TENFOR are plotted, and it will be seen that the unirradiated yarn shows a rapid fall off in fibre content between 136° C. and 138° C. In contrast, the fall off in fibre content of the irradiated and annealed fibre was gradual, with some material being retained unmelted up to 144° C. Corresponding testing was carried out on CERTRAN polyethylene having the 77% gel content, and this yielded a similar result, as shown in FIG. 2. The results from these preliminary tests indicated that the irradiated and annealed yarns should have a wider range of temperatures over which they could be compacted, than the corresponding untreated yarns. In particular, the lack of a sudden drop in fibre content indicated that the compaction process should be much more controllable, with the yarns crosslinked by irradiation and annealing.

Gel contents were measured by the method as described in the Journal of Polymer Science: Part B: Polymer Physics, 1993, Vol. 31, p. 809 (R. A. Jones, G. A. Salmon and I. M. Ward).

Compaction

Figure 3:
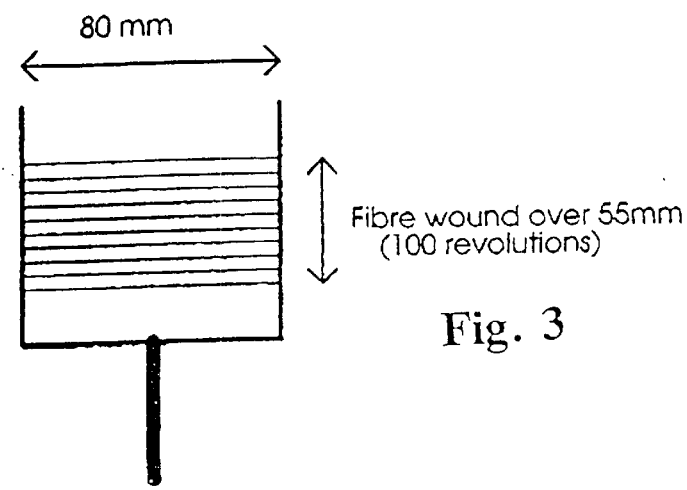
FIG. 3 shows TENFOR wound around a U-shaped former.
Figure 4:
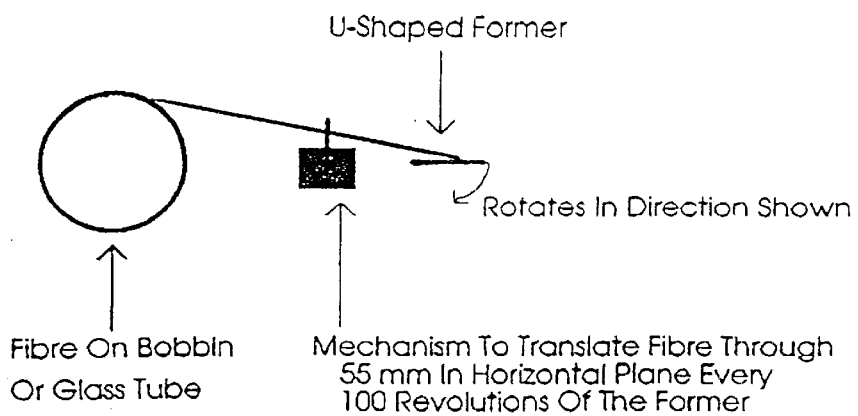
FIG. 4 shows schematically winding of yarn onto a former by revolving the former and by employing a yarn translation mechanism.
Figure 5:
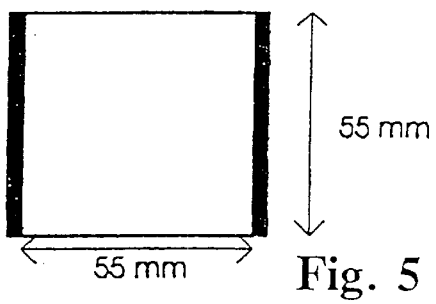
FIG. 5, FIG. 6 and FIG. 7 show wound yarn laid over a mold having two side walls and two open ends.
Figure 6:
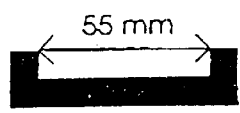
Figure 7:
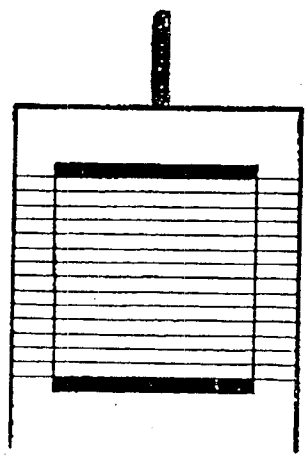

Hot compacted samples were prepared from the TENFOR irradiated and annealed yarns in the following way. The TENFOR was wound around a U-shaped former 80 mm wide and with a traverse of 55 mm, as shown in FIG. 3. The winding of the yarn onto the former was carefully controlled so that there were 100 windings of the yarn over the 55 mm traverse, this being achieved by revolving the former, and by a yarn translation mechanism, as shown schematically in FIG. 4. The yarn was thereby wound neatly, uniformly and unidirectionally. Several traverses were carried out so that there were several layers of yarn, generally 6, about the former, this number leading to compacted plaques approximately 2.25 mm thick. The wound yarn was then laid over a mould 55 mm square, and having two side walls and two open ends, as shown in FIGS. 5–7. A lid 55 mm square was then fitted over the mould, against the wound yarn, and the former was then removed. The mould assembly was then subjected to an elevated temperature at a first pressure, the contact pressure, for a set period of time, the contact time, and then subjected to a second, higher, pressure, the compaction pressure, for a shorter period of time, at the same temperature. For all samples cooling was initiated as soon as the compaction pressure was applied, thus controlling a temperature rise of up to 2° C. upon compaction. At 144° C. and above the said pressure increased naturally the contact time, and no attempt was made to prevent this.

In interpreting the results of the later compaction tests it should be noted that superheating effects due to constraint raise the optimum temperature by about 4° C., compared with the DSC experiments described earlier.

Table 1 below sets out the processing regimes for the TENFOR samples.

TABLE 1

Compaction Methods For Crosslinked Tenfor Plaques

| Temp (° C.) | Contact Time (mins) | N° of Layers Of Fibre | Contact Pressure (MPa) | Compaction Pressure (MPa) | Pressure Build |
|---|---|---|---|---|---|
| 140 | 15, 10, 5, 2 | 6 | 0.35 | 34 | No |
| 141 | 15, 5 | 6 | 0.35 | 34 | No |
| 143 | 15 | 6 | 0.35 | 34 | No |
| 145 | 15 | 6 | 0.35 | 17 | Yes |
| 148 | 15 | 6 | 0.35 | 17 | Yes |
| 150 | 15 | 4 | 0.35 | 8.4 | Yes |
| 152 | 15 | 6 | 0.35 | 3.5 | Yes |

In subsequent experiments it did not prove possible to achieve compaction in tests performed with contact pressures significantly above 0.35 MPa at a temperature of 140° C. In experiments performed at contact pressures of 0.52 and 0.7 MPa and a temperature of 140° C. the fibre in the plaques did not appear to have to undergone any melting, the plaques could be broken quite easily by hand along the yarn axis, and the yarn was still clearly visible.

Samples were prepared in a similar manner with irradiated and annealed CERTRAN yarn, but using 32 layers of windings, because of the lower denier of CERTRAN.

Table 2 below sets out the compaction regimes for the CERTRAN fibers.

TABLE 2

Methods Used To Produce Compacted Plaques of Crosslinked Certran

| Temp (° C.) | Contact Time (mins) | Number Of Layers | Contact Pressure (MPa) | Compaction Pressure (MPa) |
|---|---|---|---|---|
| 141 | 10 | 32 | 0.35 | 37 |
| 145 | 10 | 32 | 0.35 | 17 |
| 150 | 10 | 32 | 0.35 | 10 |

Testing

The flexural modulus and flexural strength of the samples in the yarn direction or perpendicular to the yarn direction, as appropriate, were measured.

Due to the size limitation of the plaques the tests could not be carried out exactly to ASTM standards. The equipment used was compliant with ASTM D790, and three point bending was used as described in method 1 of this standard. The dimensions of the specimens tested were:

| Longitudinal | Span | 40 mm |
|---|---|---|
| | Width | 5 mm |
| | Thickness | governed by plaque |
| Transverse | Span | 30 mm |
| | Width | 10 mm |
| | Thickness | governed by plaque |

In general this means that the ratio of thickness to span was around 16 to 1. In all cases the rate of crosshead motion was 1 mm per minute.

Initial longitudinal flexural modulus was determined by taking the slope of the initial part of the output curve and using the following formula.

$$\text{Modulus} = \left(\frac{\text{Load}}{\text{Deflection}}\right) \times \frac{\text{span}^3}{4 \times \text{thickness}^3 \times \text{width}}$$

Flexural strength was determined by taking the peak load before breaking and using the following formula.

$$\text{Strength} = \frac{6 \times \text{load} \times \text{span}}{4 \times \text{width} \times \text{thickness}^2}$$

Properties of Compacted TENFOR

Figure 9:
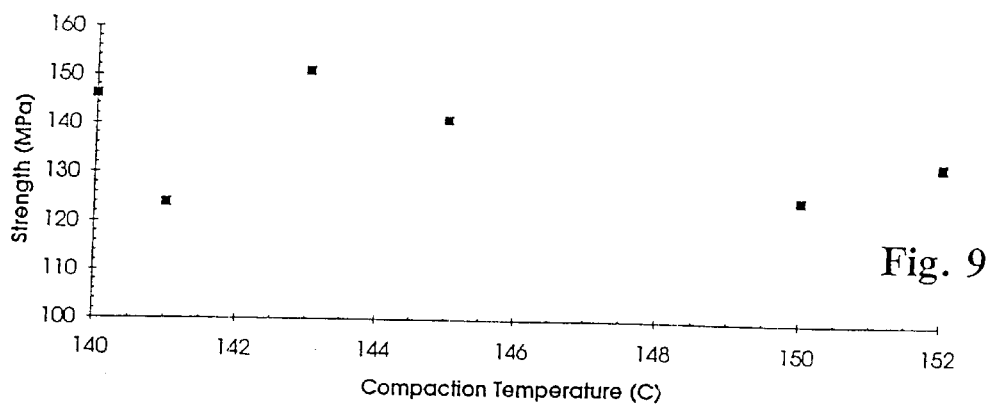
FIG. 9 shows a plot of strength versus compaction temperature for TENFOR.
Figure 10:
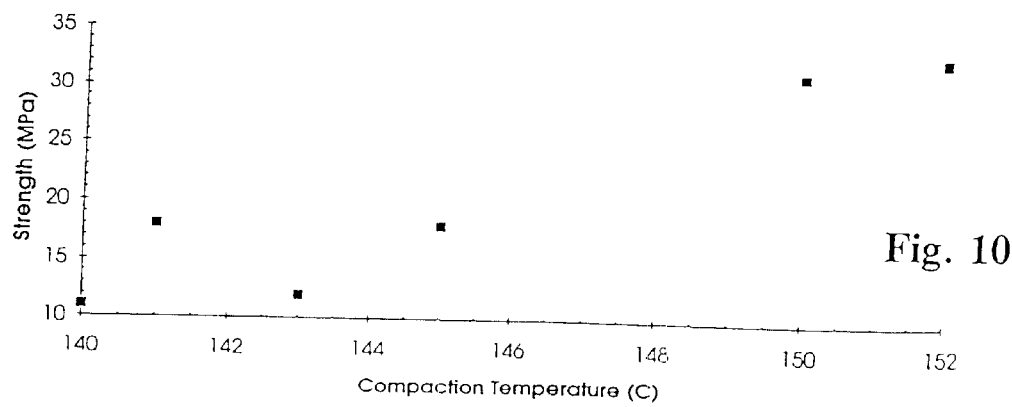

All of the measured mechanical properties are shown in Table 3 below and FIGS. 8, 9 or 10 set out the longitudinal flexural modulus, longitudinal flexural strength and transverse flexural strength of samples given a 15 period at the contact pressure at the stated temperatures.

TABLE 3

Mechanical Properties of Crosslinked Tenfor Plaques

| Compaction Method (Contact time; ° C.) | Longitudinal Flexural Modulus (GPa) | Longitudinal Flexural Strength (MPa) | Transverse Flexural Strength (MPa) | Density (Kg/m³) |
|---|---|---|---|---|
| 2 min 140  | 12.9 | 152 | 19   | — |
| 5 min 140  | 19.7 | 139 | 20   | — |
| 10 min 140 | 19.5 | 158 | 27   | — |
| 15 min 140 | 19.5 | 146 | 11   | 973.3 |
| 15 min 141 | 17.0 | 124 | 18   | 973.1 |
| 15 min 143 | 13.1 | 151 | 12   | 972.4 |
| 15 min 145 | 11.8 | 141 | 18   | 965.9 |
| 15 min 148 | 7.0  | —   | "    | 964.7 |
| 15 min 150 | 2.1  | 125 | 31.2 | 963.1 |
| 15 min 152 | 2.25 | 132 | 32.6 | 962.4 |

Figure 8:
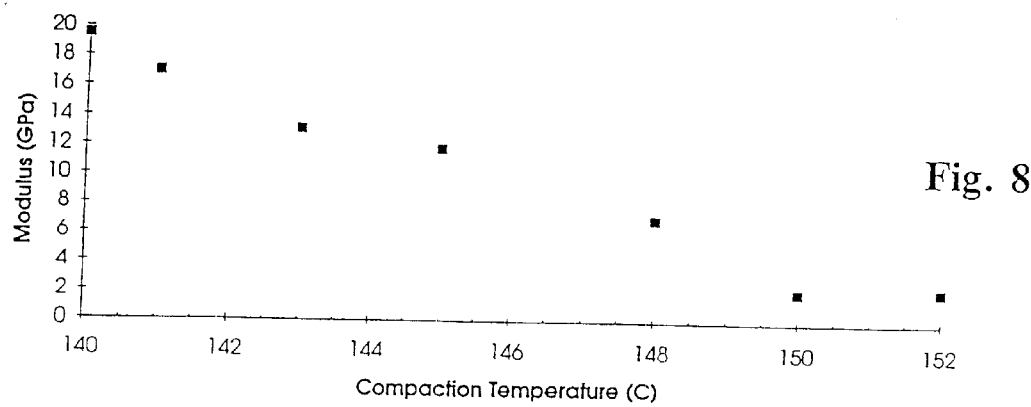
FIG. 8 shows a plot of modulus against compaction temperature for TENFOR.

For a fixed contact time of 15 minutes the longitudinal flexural modulus decreases steadily from 19.5 GPa at 140° C. to 2.5 GPa at 152° C., FIG. 8. The longitudinal flexural strengths remain relatively constant from 140° C. to 152° C., at around 140 MPa, FIG. 9. The transverse flexural strengths are constant around 15 MPa from 140° C. to 145° C., and then increase with increasing temperature, FIG. 10.

Clearly, the properties of the plaques vary with temperature and, based on the compactions at 140° C., contact time. The optimum contact time can be determined by trial and error. The optimum temperature will depend on the properties required. However, the results make it clear that, as anticipated by the DSC work described earlier, there is a reasonable degree of latitude, in terms of the temperature, in carrying out compaction. Within the 12° C. range in the tests, there were no abrupt fall-offs in properties of the plaques, as would be expected with corresponding compaction of unirradiated yarns, using the method as described in GB 2253420B.

Comparative Tests on TENFOR

Further experiments were carried out to compare the properties of plaques moulded from crosslinked and normal (non-crosslinked) TENFOR polyethylene.

The data for normal TENFOR was gathered using the same method as for the crosslinked TENFOR. The only differences were that the contact pressure was 0.7 MPa as compared to 0.35 MPa for the crosslinked material, and the contact time was 10 minutes instead of 15 minutes.

The results are set out in Table 4 below. This mentions degrees Celsius above the onset of compaction, instead of giving absolute temperature values. Temperature is indicated in this way because the crosslinked and non-crosslinked materials started to compact at different temperatures. We believe this is due to crosslinking delaying the onset of melting.

TABLE 4

Comparison of Mechanical Properties of Crosslinked and Non-crosslinked TENFOR

| Degrees Celsius above onset of compaction | Non-crosslinked (GPa) | Crosslinked (GPa) |
|---|---|---|
| a) Longitudinal Flexural Modulus | | |
| Onset | 17.5 | 19.5 |
| 1 | 15.5 | 17.0 |
| 2 | 16.7 | |
| 3 | completely melted | 13.1 |
| 5 | | 11.8 |
| 8 | | 7.0 |
| 10 | | 2.1 |
| b) Longitudinal Flexural Strength | | |
| Onset | 139.5 | 146 |
| 1 | 108.6 | 124 |
| 2 | 117.8 | |
| 3 | completely melted | 151 |
| 5 | | 141 |
| 8 | | |
| 10 | | 125 |
| c) Transverse Flexural Strength | | |
| Onset | 23.5 | 11.0 |
| 1 | 38.5 | 18.0 |
| 2 | 38.5 | |
| 3 | completely melted | 12.0 |
| 5 | | 18.0 |
| 8 | | |
| 10 | | 31.2 |

Properties of Compacted CERTRAN

The mechanical properties of the plaques compacted from the irradiated and annealed CERTRAN fibers were tested in the same way as described above for plaques of TENFOR fibers. The results are shown in Table 5 below.

TABLE 5

Mechanical Properties of Irradiated CERTRAN Plaques

| Compaction Temperature (° C.) | Longitudinal Flexural Modulus (GPa) | Longitudinal Flexural Strengtn (MPa) | Transverse Flexural Strength (MPa) |
|---|---|---|---|
| 141 | 11.3 |     | 20.8 |
| 145 | 5.7  | 127 | 25.5 |
| 150 | 4.9  | 111 | 30.2 |

The lower than expected modulus results, when combined with the relatively high transverse strengths and the observation that more material extruded from the mould than in the case of the TENFOR suggests that more fibre was destroyed by melting, than with the TENFOR. Thus it was concluded that compaction conditions are slightly different than for TENFOR, and a higher contact pressure must be used.

Regrettably all the irradiated and annealed CERTRAN had been used and no further compaction could be attempted. However, even these preliminary results indicate that a wide "temperature window" should be available for compaction.

Elevated Temperature Properties—CERTRAN

Plaques made from crosslinked and non-crosslinked CERTRAN were tested for their mechanical properties at elevated temperature.

A. Properties of 63% gel fraction materials.

Figure 11:
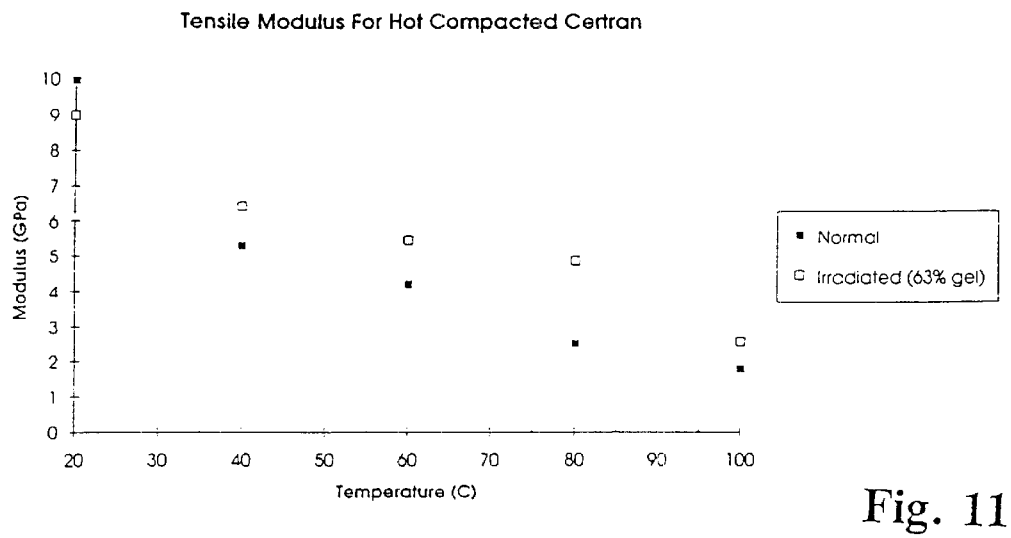
FIG. 11 shows a plot of modulus versus temperature for hot compacted CERTRAN.
Figure 12:
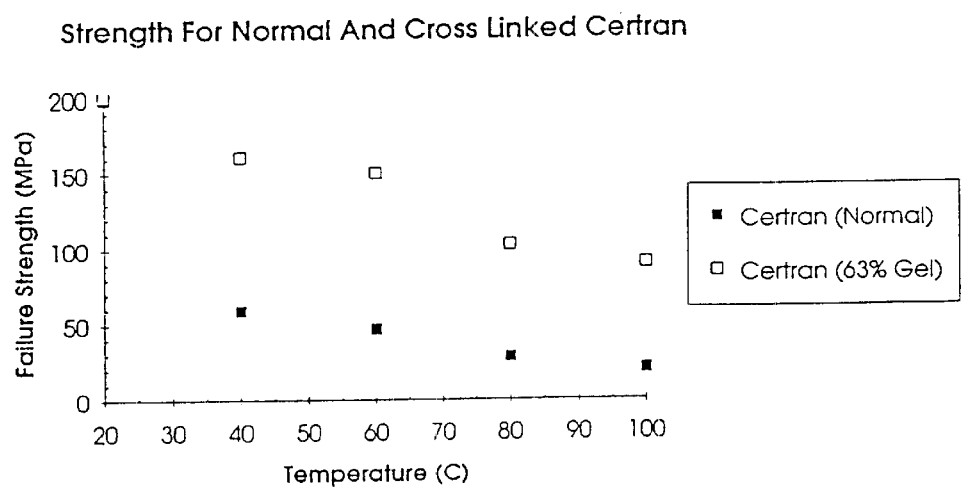
FIG. 12 shows a plot failure strength against temperature for normal and cross-linked CERTRAN.
Figure 13:
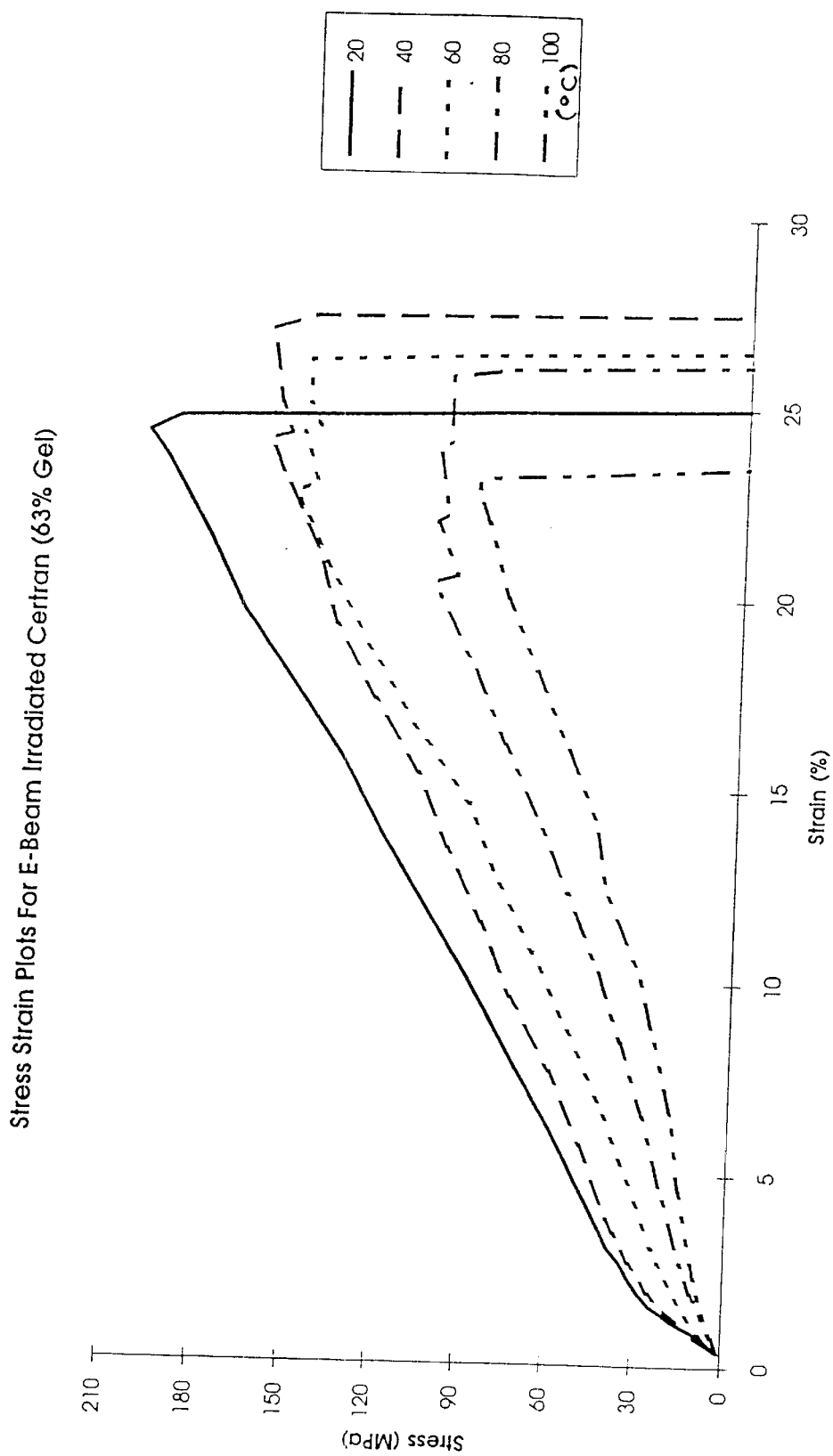
FIG. 13 shows a plot of stress versus strain for CERTRAN.
Figure 14:
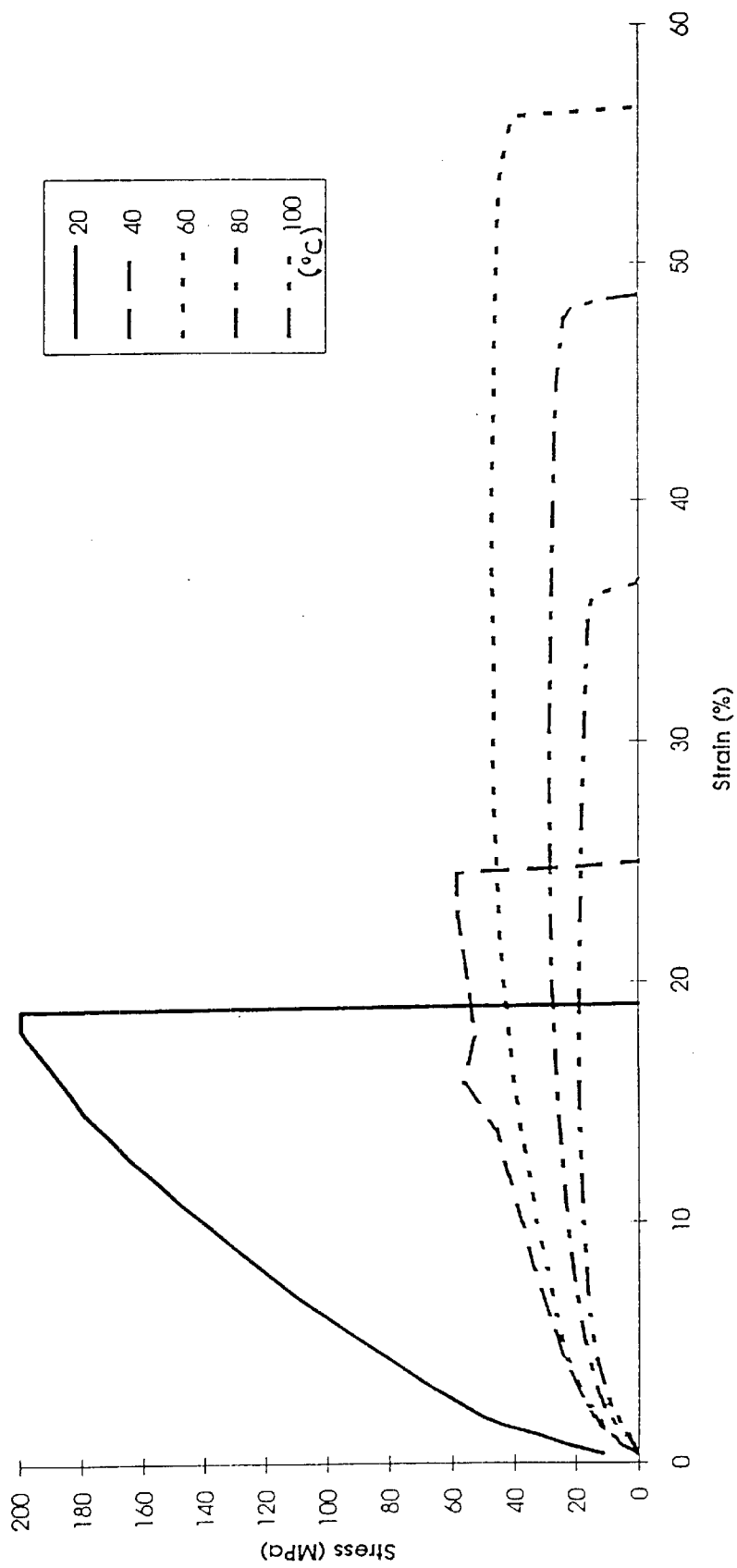
FIG. 14 shows a further plot of stress versus strain for CERTRAIN.

A piece of woven CERTRAN cloth 51 cm long by 13 cm wide was wound around a former. For irradiation it was placed in a glass tube and irradiation was carried out by electron beam. The electron beam irradiation was to a total dose of 4.5 MRad, in an acetylene environment at a pressure of $3 \times 10^4$ Pa above atmospheric, at ambient temperature. The polymer was then annealed for 2 hours at 90° C. in acetylene, at a pressure of $3 \times 10^4$ Pa above atmospheric. The resultant gel fraction was 63%. The treated cloth was then compacted using a two-stage process as described above, at a temperature of 144° C., with a contact time/pressure of 10 minutes/0.35 MPa, followed by compaction at 7 MPa. Dumbbell-shaped samples of 26 mm gauge length were cut from it for tensile testing. The results of these tensile tests, carried out over a range of temperatures, and performed at a nominal strain rate of 20% per minute, are shown in FIGS. 11 and 12. It will be seen that the crosslinked CERTRAN plaques have better hot temperature failure strength, than the non-crosslinked plaques. FIGS. 13 and 14 show stress-strain curves of the 63% gel fraction crosslinked material and the untreated fibre respectively over a range of temperatures. It is seen that the cross linking substantially changes the stress-strain behaviour.

B. Properties of 85% gel fraction materials.

Figure 15:
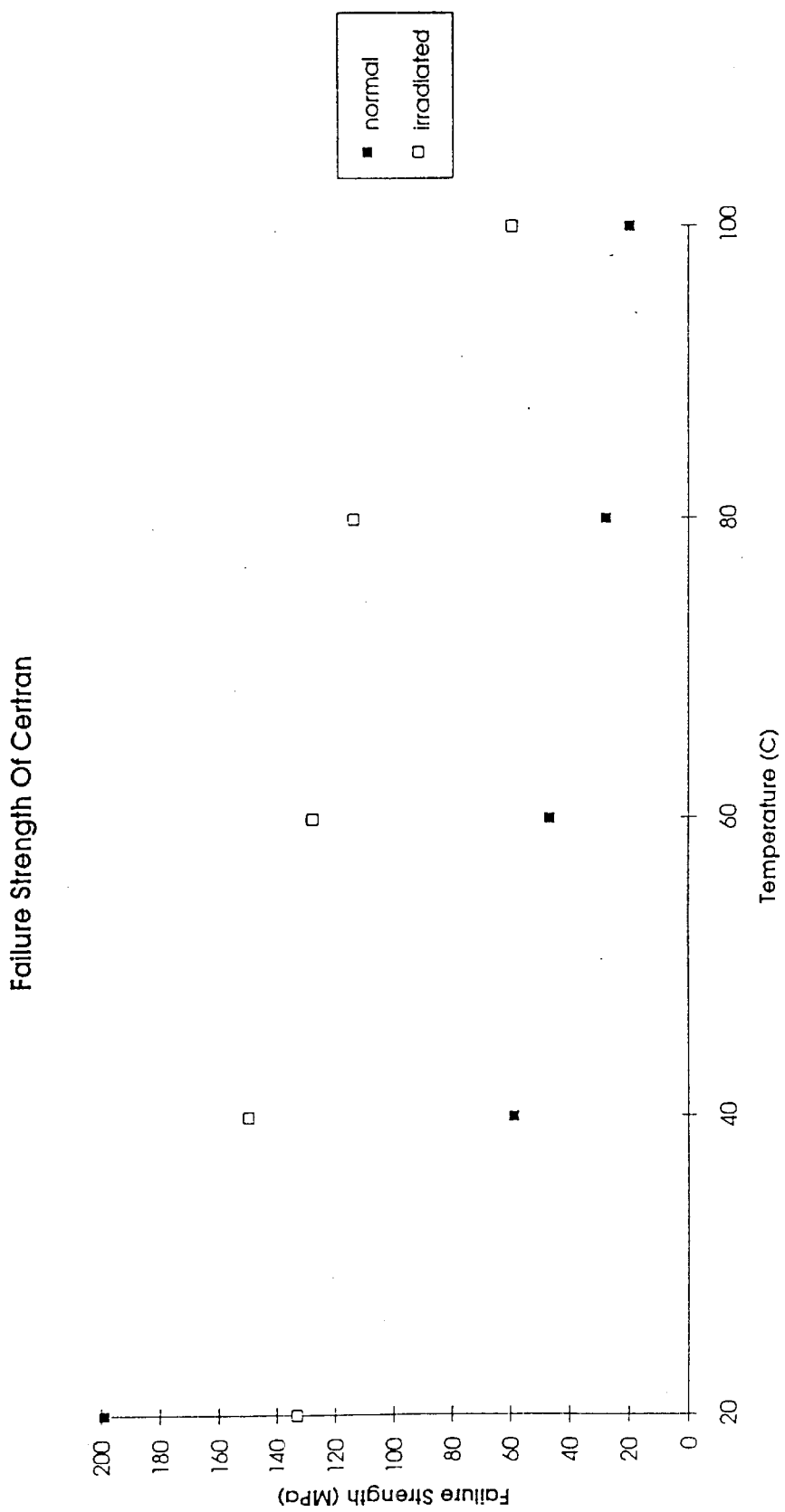
FIG. 15 is a plot of failure strength versus temperature for CERTRAIN.

FIG. 15 shows the tensile failure strengths of samples prepared from 85% gel fraction CERTRAN yarn. The yarn had been irradiated by 7 radiation to a total dose of 5 MRad, in acetylene at a pressure of $5 \times 10^4$ Pa atmospheric, at ambient temperature; then annealed for 2 hours at 90° C. in acetylene, at the same pressure. The treated polymer was then compacted using a two-stage process as described above, at a temperature of 144° C. with a contact time/pressure of 10 minutes/0.35 MPa, and a compaction pressure of 7 MPa. The plaques thus formed were tested at different temperatures, and compared to untreated samples. It will be seen that the pre-irradiated plaques have substantially better failure strengths at elevated temperatures. In this case those plaques had lower failure strength at 20° C. This is thought to be due to the fact that the gel fraction, at 85%, is higher than is optimal.

Single Stage Compaction—CERTRAN 10 kg of woven CERTRAN cloth, 107 cm wide, was placed in a purpose built cylinder, which was first evacuated and then pressurised to $6 \times 10^4$ Pa with acetylene. Irradiation was carried out using 7 radiation to a dose of 1.8 MRad at ambient temperature. After irradiation the cylinder and cloth were repressurised to $6 \times 10^4$ Pa with acetylene and annealed at 90° C. for 8 hours. After annealing the cloth was removed from the cylinder and scoured to remove any by-products of the crosslinking process. In addition it was found that optimum compaction was achieved if the surface of the cloth was lightly abraded over a sandpaper covered roller to further remove any crosslinking by-products. The gel content of the crosslinked cloth was measured as 62%.

Compaction experiments were carried out at 144° C. using a single stage process with a pressure of 0.7 MPa used throughout. Dumbbell samples were cut from the compacted sheets and tensile modulus and strength were determined at 20° C. and 80° C. Table 6 below shows a comparison of these results with results for compacted crosslinked CERTRAN cloth using a two stage process (compaction temperature 144° C., contact pressure 0.35 MPa and compaction pressure 7 MPa, also lightly abraded before compaction) and results for compacted non-crosslinked CERTRAN cloth (compaction temperature 139° C., contact pressure 0.7 MPa and compaction pressure 7 MPa, non-abraded).

TABLE 6

|  | Non-crosslinked | Crosslinked | Crosslinked |
|---|---|---|---|
| Compaction Temperature | 139° C. | 144° C. | 144° C. |
| Contact pressure | 0.7 MPa | 0.35 MPa | 0.7 MPa |
| Compaction pressure | 7 MPa | 7 MPa | 0.7 MPa |
| Tensile Modulus (20° C.) | 10.0 GPa | 9.8 GPa | 10.1 GPa |
| Tensile Strength (20° C.) | 200 MPa | 200 MPa | 220 MPa |
| Tensile Modulus (80° C.) | 2.7 GPa | 5.3 GPa | not measured |
| Tensile Strength (80° C.) | 20 MPa | 100 MPa | 107 MPa |

In general it may reasonably be concluded from the totality of the experiments carried out, that the properties of compacted plaques prepared from polyolefin given a pretreatment of irradiation and annealing in order to achieve crosslinking are more controllable due to the wider melting range, and exhibit certain improvements in mechanical properties, particularly failure strength at elevated temperatures.

What is claimed is:

1. A polyolefin polymer monolithic article comprising crosslinked molecularly oriented polymeric polyolefin fibers bound together by a recrystallized polymer melt phase comprising from 10% to 50% by weight of the polymer in the article wherein both fibers and recrystallized polymer melt phase are derived from a precursor assembly of crosslinked molecularly oriented polyolefin polymer fibers by partial melting of that precursor assembly.

2. A polyolefin monolithic article prepared by a process wherein an assembly of fibers of molecularly oriented polyolefin polymer is subjected to a compaction stage wherein the assembly is maintained in intimate contact at an elevated temperature sufficient to melt a proportion of the polymer, and is compacted, wherein prior to the compaction stage the fibers have been subjected to crosslinking.

* * * * *